Oct. 9, 1945.   G. A. LYON   2,386,233
WHEEL STRUCTURE
Filed June 21, 1943   2 Sheets-Sheet 2
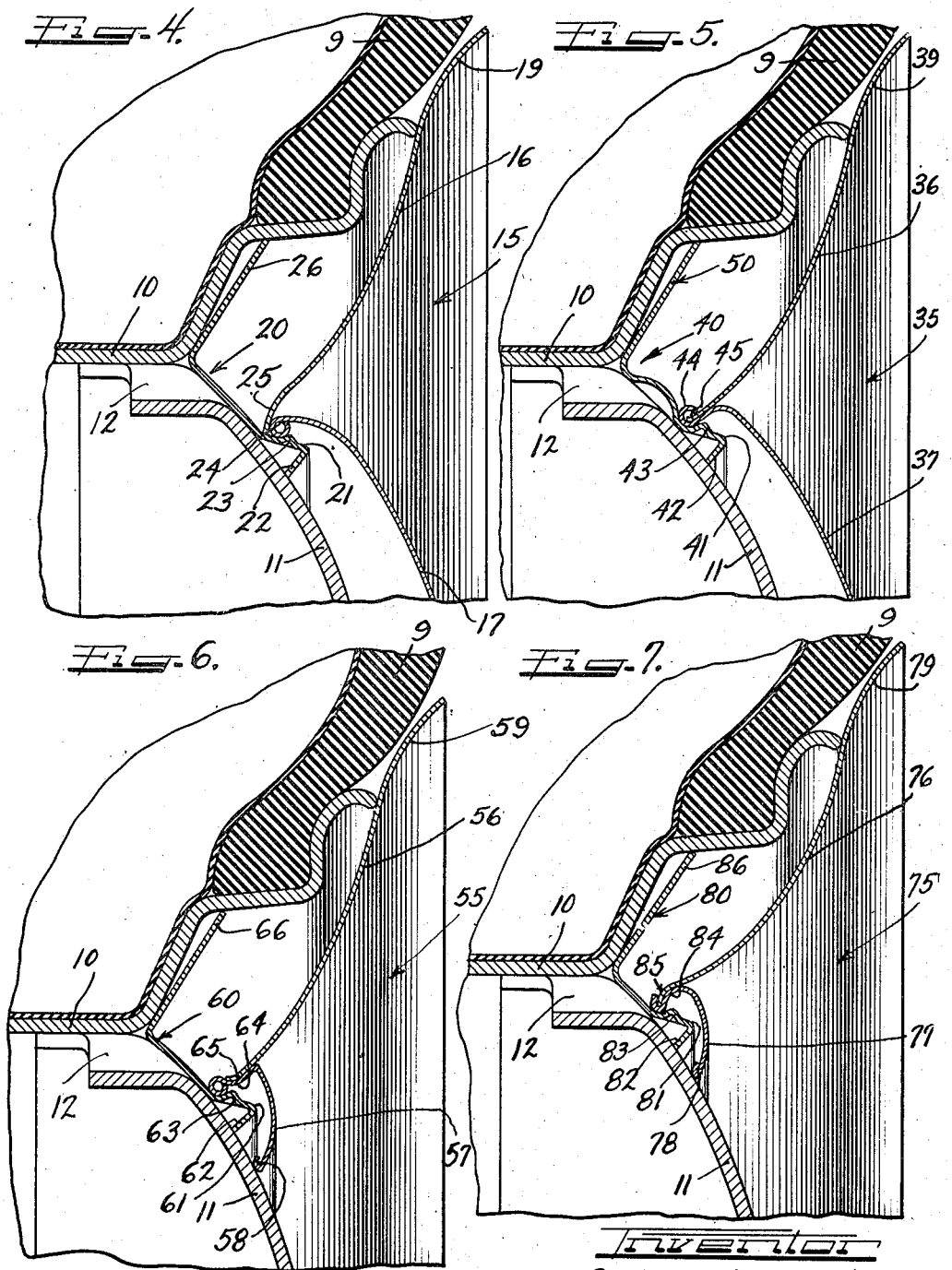

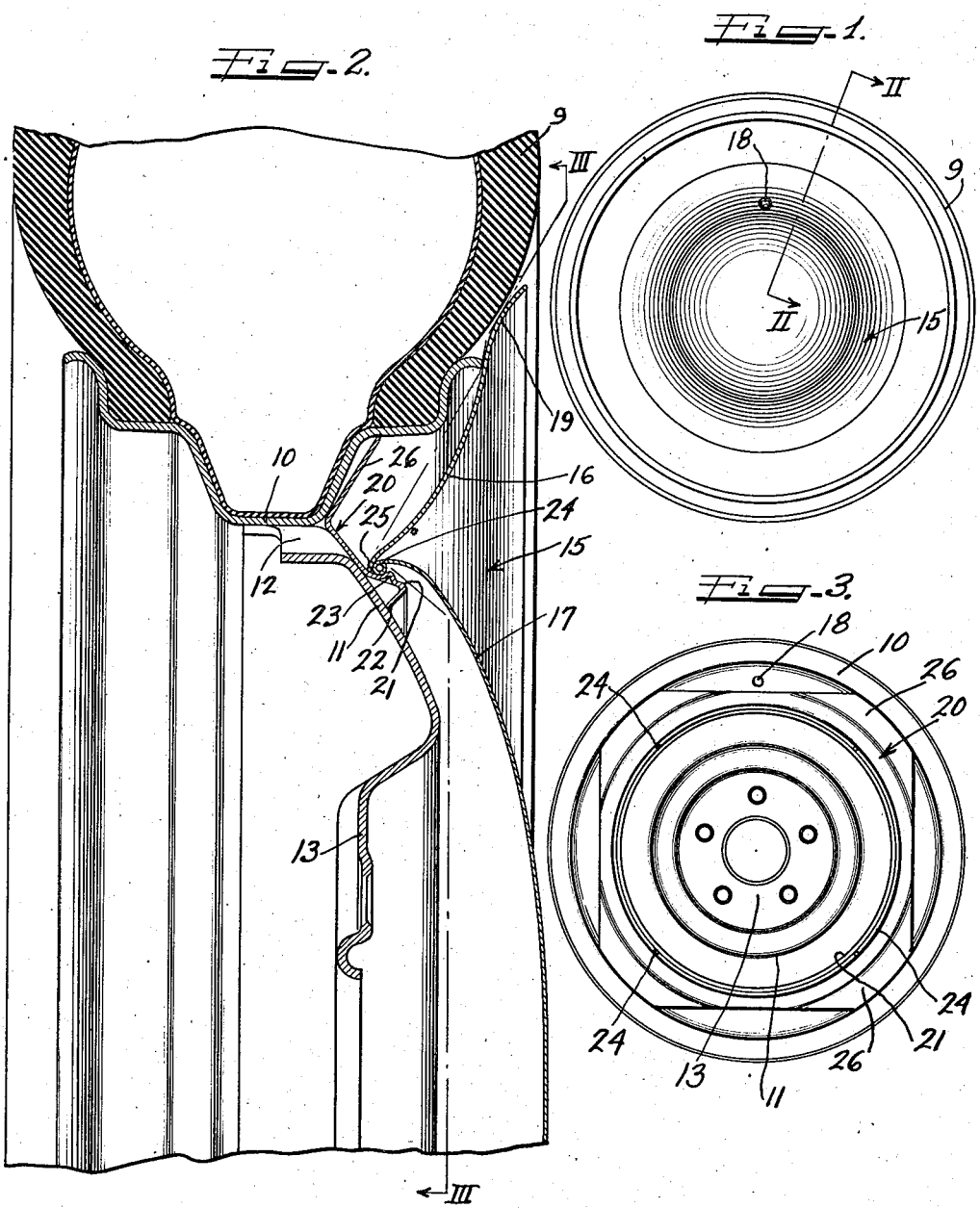

Patented Oct. 9, 1945

2,386,233

UNITED STATES PATENT OFFICE 2,386,233

WHEEL STRUCTURE

George Albert Lyon, Allenhurst, N. J.

Application June 21, 1943, Serial No. 491,601

7 Claims. (Cl. 301—37)

This invention relates to a wheel structure and more particularly to a novel manner of holding a wheel trim, including a trim ring and hub cap on wheels.

An object of this invention is to provide in a wheel structure novel and economical wheel trim retaining means.

A still further object of the invention is to provide retaining means of such character that the same may become a part of the wheel without necessitating its removal each time the wheel trim or cover is removed.

Another object is to provide a novel wheel structure wherein wheel trim including either or both a trim ring and hub cap may be detachably retained in an effective manner on the body and rim of a wheel.

In accordance with the general features of this invention, there is provided in a wheel structure including the usual multi-flanged tire rim and body part, a cover retaining ring having a central annular portion with shoulder means over which an edge of a cover is adapted to be snapped into retained engagement therewith and also having four radial corner portions formed into inclined radially outwardly extending fingers for resilient snap-on retaining engagement with the rim of the wheel.

A further feature of the invention relates to the formation and arrangement of the shoulder means in the aforesaid wheel structure so that it may retain either or both a trim ring and a hub cap on the wheel.

A still further feature of the invention relates to the forming of shoulder means in the aforesaid structure in the form of a plurality of protuberances which are cooperable with a central trim member which may be either in the form of an annular bead or in the form of a hub cap and over which the inner edge of a trim ring may be resiliently snapped for detachable cooperation therewith.

Yet another feature of the invention relates to the forming of the trim ring and hub cap members in the aforementioned structure of a plastic material of self-sustaining form and being highly resilient so that it will always tend to return to its initial or normal position after each deflection or deformation of the same.

Other objects and features of this invention will more fully appear from the following detailed description taken in connection with the accompanying drawings which illustrate several embodiments thereof, and in which Figure 1 is a side elevation of a wheel structure embodying the features of this invention;

Figure 2 is an enlarged fragmentary cross-sectional view taken on the line II—II of Figure 1 looking in the direction indicated by the arrows, and showing how both a trim ring and wheel cover may be detachably held on a wheel by my novel retaining means;

Figure 3 is an elevational view taken on the line III—III of Figure 2 with the trim ring and cover removed and looking in the direction indicated by the arrows, such view showing clearly the construction of the retaining means with reference to the four corners of the same;

Figure 4 is an enlarged fragmentary cross-sectional view corresponding to the upper right-hand portion of Figure 2;

Figure 5 is an enlarged fragmentary cross-sectional view similar to Figure 4 illustrating a modification of the invention wherein the trim ring and hub cap are lock-seamed together;

Figure 6 is an enlarged fragmentary cross-sectional view corresponding to Figure 4 and illustrating a further modification of the invention wherein the central trim member is in the form of an annular metallic bead instead of in the form of a hub cap; and Figure 7 is an enlarged fragmentary cross-sectional view similar to Figure 6 but differing from Figure 6 in that it shows the central metallic bead lock-seamed to the outer trim ring.

As shown on the drawings:

The reference character 9 designates generally a conventional type of tire having the usual inner tube with a valve stem extending through one of the flanges of a multi-flanged drop-center type of tire rim designated generally by the reference character 10. The valve stem is shown at 18 in Figures 1 and 3 and it will be perceived that it does not project through the retaining means for the wheel cover, but it does extend through an opening in the trim ring, as is clearly evident from Figure 1.

The conventional drop-center type of tire rim 10 is fastened at a plurality of spaced areas to a conventional blanked wheel body or spider 11 having the usual spaced ventilation openings 12 between the areas of attachment to the rim. The wheel body also has a central dished portion provided with the usual bolt-on flange 13 by means of which the wheel may be attached in the usual way to a support on an axle or the like.

The wheel cover assembly of my invention is designated generally by the reference character 15 and includes an outer annular trim ring 16 and a central cover member or hub cap 17. The outer trim ring 16 is of a convex-concave cross-sectional shape and, as in the case of all modifications of my present invention, is preferably made of a very light plastic material which has the physical property of being self-sustaining with respect to form and yet resiliently resistant to permanent deformation. That is to say, this trim ring may be bodily flexed for the purpose of getting to the rear side of the same without permanently distorting the ring, and immediately upon being released it will spring back to its original shape, shown in Figure 2.

I have attained excellent results by making such trim rings of a thermoplastic material, and have used a material known to the trade as ethyl-cellulose.

The outer peripheral portion of this trim ring 16 is formed into an outwardly curved lip 19 which causes the edge of the ring to be out of engagement with the side wall of the tire and yet presents a lip portion which may be readily manually gripped for the purpose of flexing the trim ring axially outwardly relative to its inner point of attachment.

The inner peripheral edge of the ring 16 is slightly turned at 25 and is adapted to cooperate with my novel retaining means to be described hereinafter and which is designated generally by the reference character 20.

Disposed centrally of the wheel assembly is a central cover member 17 referred to before as a hub cap. As will be noted hereinafter, this central member may likewise take the form of an annular bead as is clearly shown in Figures 6 and 7. While the hub cap may be made of a plastic material, such as above referred to, I prefer in this embodiment to have the hub cap made of metal. I have attained excellent results by making the hub cap and trim ring of plastic since I have found that such trim may be indented as much as two inches by a sudden blow without becoming permanently distorted or deformed. That is to say, the natural springiness of the material will cause the dented portion to immediately spring back to its original shape. This is true of all embodiments where plastic is used.

As best shown in Figure 4, the hub cap or central cover part 17 has an outer turned rearward edge 24 cooperable with my novel cover retaining means which will now be described.

This cover retaining means 20 includes an annular flange portion 21 which is inclined away from the body 11 as well as an inwardly inclined leg or flange 22. The two flanges form a rib-like bead and are, of course, made of a relatively strong material such, for example, as metallic sheet. The flange 21 is of annular form, as is shown in Figure 3. Also the flange 21 has a plurality of spaced shoulders in the form of protuberances which, for example, may be four in number (Figure 3). These protuberances extend generally radially outwardly and are cooperable with the turned edge 24 of the central cover member.

The flange construction 21 also has a plurality of angular outwardly extending corner portions 26 (Figures 3 and 4) each of which comprises a resilient finger adapted to resiliently grip an axially extending flange of the tire rim for the purpose of holding the retaining ring 20 on the wheel. The angular cross-section of these finger portions 26 is such that this portion first extends in a direction generally toward the base of the rim and then radially outwardly in a direction toward an axially extending flange of the rim.

The construction is such that by the act of pressing the ring axially onto the wheel it is possible to wedge the four corners 26 in tight retaining engagement with the axially extending flange of the rim. When thus mounted on the wheel the retaining ring presents rigidly positioned spaced protuberances 23 over which the inner edge 24 of the hub cap 17 may be snapped; this edge being made of a diameter slightly less than the outermost diameter of the circle in which the protuberances 23 are disposed so that when the edge is pressed home behind the protuberances it is under tension sufficient to hold the cap in position on the wheel.

The trim ring may have its inner edge 25 resiliently stretched over the hub cap until it is behind the turned edge 24 and is thus retained on the wheel.

To pry the trim ring and hub cap from the wheel all that is necessary is to flex the trim ring 16 away from the wheel and insert a pry-off tool therebehind into engagement with the turned edge 25 which is backed up with the more rigid edge 24. A slight pressure thereafter will forcibly eject the trim ring and hub cap from its retaining cooperation with the protuberances 23.

In Figure 5 I have illustrated a modification of the invention wherein as far as the structure and physical properties of the three parts of the ring are concerned, they are substantially the same as in the previously described form. In this form of the invention the cover is designated generally by the reference character 35 and includes an outer plastic trim ring 36, a central hub cap 37 and a retaining ring 40 to the rear of the cover. The trim ring 36 functions substantially the same as the trim ring 16 and has an outer turned lip 39 for the same purpose as in the trim ring 16.

The retaining ring 40 includes an annular flange 21 having a rearwardly extending leg 42 and which flange 21 is provided with spaced protuberances 43.

The principal difference between this form and the one previously described resides in the fact that the outer edge 44 of the hub cap 37 is lock-seamed to the inner edge 45 of the trim ring so that the two are in effect integrally connected together. The flange 41 has formed on it at four equidistantly spaced points angular finger portions 50 corresponding in action and function to the fingers 26.

The operation and structural characteristics and physical properties of the parts of this form are the same as those of the previously described form.

It should be noted that in all forms of the invention I have used the same reference numerals on the parts of the wheel since substantially the same wheel structure is used in all embodiments; hence a detail description of each of the wheels in the different forms is not required.

In the modification shown in Figure 6 the wheel cover assembly is designated generally by the reference character 55 and includes a plastic trim ring 56 having an outer flexible lip 59. Instead of a hub cap this form of the invention has associated with the trim ring an annular hollow metallic bead 57 having an inwardly turned outer edge or skirt 64 on which the inner turned edge 65 of the trim ring 56 is adapted to be sprung and nested.

The inner edge of the bead 57 is turned upon itself at 58 so as not to present a sharp edge.

The cover structure just described is held on the wheel by means of a retaining ring 60 which is similar to the ring 20. This ring has a central annular flange portion 61 reenforced by a rearwardly extending flange or leg 63. The flange 61 has formed on it a plurality of spaced protuberances over which the inner turned edge of the bead 63 is adapted to be resiliently snapped in a manner similar to that described in the case of the hub cap 17. The trim ring 56 may be applied to the bead from the rear side of the same prior to the application of the bead to the ring. The ring also has at its four corners angular retaining fingers 66 which correspond in action and function with the fingers 26 of the first described form of the invention.

In the last form of the invention shown in Figure 7 the central bead 77 and the outer trim ring 76 of the wheel cover 75 are lock-seamed together instead of being detachably connected. The trim ring 66 has an outer flexible lip 79 as in the case of the previous forms of the invention, and also has an inner edge 85 turned and interlocked in the turned inner edge 84 of the central metal bead 77. This metal bead 77 also has its radially inner edge turned back upon itself at 78 to reenforce the same. Thus the trim ring 76 and the metal bead 77 are interlocked or lock-seamed together so as to be a single unit.

This cover is held on the wheel by means of a retaining ring 80 which is similar to the retaining ring 20. It includes a flange 81 reenforced by a leg or flange 82, which flange 81 has a plurality of spaced protuberances 83 over which the turned inner edge of the metallic bead 77 is adapted to be snapped into retaining engagement therewith.

The flange 81 terminates rearwardly in a plurality of corner portions 86, each of which is of an angular construction and defines a finger such as the finger 26 for retaining the ring 80 on the wheel.

It is to be understood that the operation of all forms of the invention is substantially the same and since such operation is believed to be evident from the description of the first described form, it is not thought necessary to repeat the description in the case of each of the forms of the invention.

In all forms the resiliently flexible outer trim ring is of such concave cross-sectional shape and of such radial depth as to cause it to appear to be an extension of the side wall of the tire. This is particularly true when it is given an external light or white finish, which I have found will cause the adjoining tire to appear to have a white side wall which comprises the trim ring.

It should also be noted that in the first form of the invention the retaining ring 20 may be used with either or both a trim ring and a central cover or hub cap. It is preferable, however, to use both of these wheel trim parts since one of them conceals the fingers 26 and the other conceals the annular flanges 21 and 22.

In addition, in all forms the trim ring is formed to bear against the outer edge of the rim inwardly of its outer lip and that after each flexing of the trim ring it will by its own inherent resiliency snap back into engagement with such edge. By keeping the extreme outer edge of the trim ring away from and out of contact with the side wall of the tire I am able to reduce the likelihood of wear and tear between the tire and edge of the trim ring.

I claim as my invention:

1. In a wheel structure including a multi-flanged tire rim and a body part, a cover retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel, said ring also having at the inner margin thereof a flange bent substantially axially inwardly so that the edge thereof supportingly abuts the wheel body to impart rigidity to said shoulder means, and a circular cover having an edge portion pressed axially over and behind said shoulder means for concealing one of the parts of the wheel.

2. In a wheel structure including a multi-flanged tire rim and a body part, a cover retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel, said ring also having at the inner margin thereof a flange bent substantially axially inwardly so that the edge thereof supportingly abuts the wheel body to impart rigidity to said shoulder means, and a circular cover having an edge portion pressed axially over and behind said shoulder means for concealing one of the parts of the wheel, said cover comprising an annular trim ring of a radial depth to conceal the exposed outer flanges of the rim and made of a plastic material which has the physical property of being self-sustaining with respect to form and yet being resiliently resistant to permanent deformation, the outer edge of said trim ring being manually deflectable for the purpose of bodily flexing a portion of the trim ring away from the rim in order to afford access to the rear side thereof.

3. In a wheel structure including a multi-flanged tire rim and a body part, a cover retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel, a circular cover having an edge portion pressed axially over and behind said shoulder means for concealing one of the parts of the wheel, said cover comprising a central hub cap for covering a portion of the wheel body and having an outer peripheral turned portion of a diameter normally less than the diameter of said shoulder means so as to require flexing of said edge in order for it to be pressed over and behind said shoulder means into retaining engagement therewith, and a trim ring having an inner peripheral edge of a diameter such that it may be resiliently flexed over the top of the hub cap into resilient engagement behind the edge of the hub cap whereby said shoulder means can retain both the hub cap and the trim ring on the wheel, said trim ring extending radially outwardly for concealing the outer side flanges of the tire rim.

4. In a wheel structure including a multi-flanged tire rim and a body part, a cover retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel, a metallic annular bead having an outer peripheral edge of such a diameter that it may be flexed over the top of said shoulder means into retained engagement with the rear of the shoulder means, and a plastic trim ring attached to said metallic bead and extending radially outwardly over the exposed outer side flanges of the tire rim, said trim ring being made of a self-sustaining material with respect to form and yet being resiliently deflectable without permanent deformation, the outer peripheral margin of the trim ring extending beyond the rim alongside of the tire in a position where it may be manually gripped for the purpose of flexing the trim ring bodily away from the tire rim.

5. In a wheel structure including a multi-flanged tire rim and a body part, a cover retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel, a metallic annular bead having an outer peripheral edge of such a diameter that it may be flexed over the top of said shoulder means into retained engagement with the rear of the shoulder means, and a plastic trim ring attached to said metallic bead and extending radially outwardly over the exposed outer side flanges of the tire rim, said trim ring being made of a self-sustaining material with respect to form and yet being resiliently deflectable without permanent deformation, the outer peripheral margin of the trim ring extending beyond the rim alongside of the tire in a position where it may be manually gripped for the purpose of flexing the trim ring bodily away from the tire rim, said trim ring also having its inner peripheral edge resiliently stretched over the outer peripheral portion of said metallic bead.

6. In a wheel structure including a multi-flanged tire rim and a body part, a cover retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel, a metallic annular bead having an outer peripheral edge of such a diameter that it may be flexed over the top of said shoulder means into retained engagement with the rear of the shoulder means, and a plastic trim ring attached to said metallic bead and extending radially outwardly over the exposed outer side flanges of the tire rim, said trim ring being made of a self-sustaining material with respect to form and yet being resiliently deflectable without permanent deformation, the outer peripheral margin of the trim ring extending beyond the rim alongside of the tire in a position where it may be manually gripped for the purpose of flexing the trim ring bodily away from the tire rim, said trim ring having an inner peripheral edge locking to an outer peripheral portion of said metallic bead whereby the bead holds the trim ring on the wheel.

7. In a wheel structure including a wheel having a tire receiving rim part and a body part, an annular trim section inclined radially and axially inwardly from the outer edge of the rim part toward the body part to substantially cover an outer side of the rim, and retaining means for said section comprising an angular flange having four corners and including a portion to which an inner edge of said trim section is attached, said flange having at said four corners thereof resilient fingers for retaining cooperation with one of said wheel parts.

GEORGE ALBERT LYON.